Jan. 18, 1955   D. R. STEWART ET AL   2,700,134
METHOD OF DETERMINING THE PRODUCTIVE OUTPUT OF A MACHINE
Filed Jan. 5, 1950
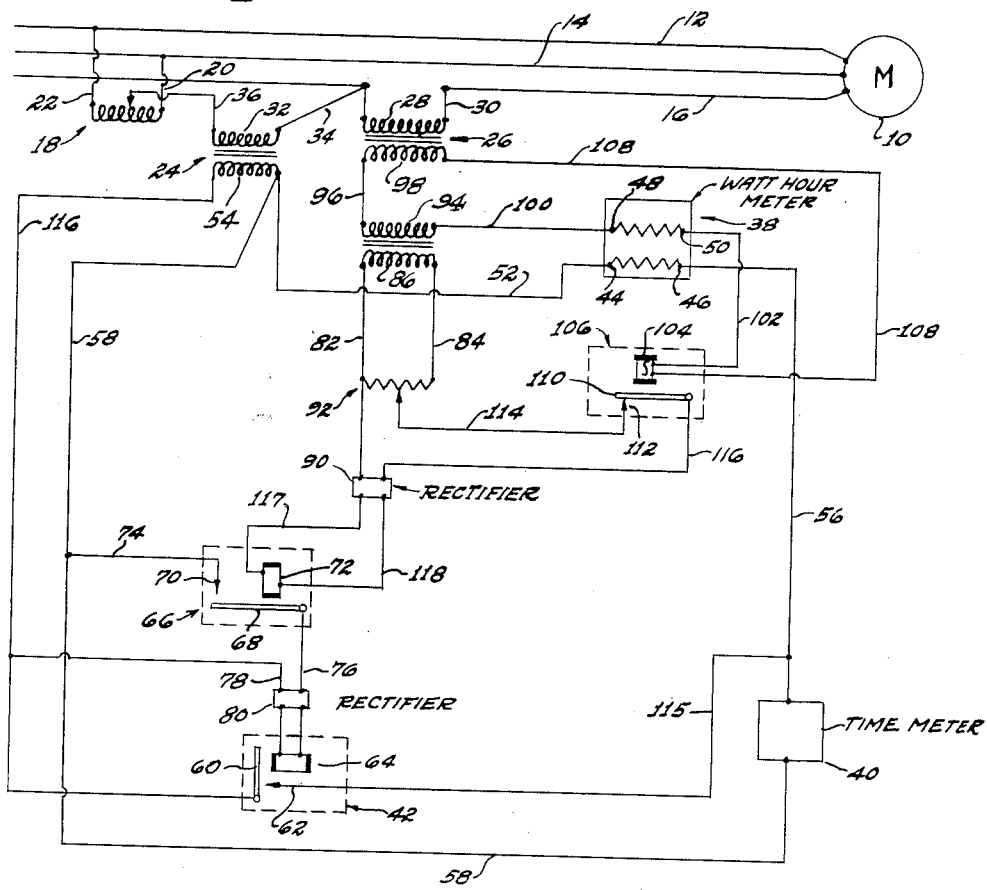
INVENTOR.
DONALD R. STEWART.
ELLIS D. KANE.
BY
Wallace P. Lamb
their Attorney.

United States Patent Office 2,700,134
Patented Jan. 18, 1955

2,700,134

METHOD OF DETERMINING THE PRODUCTIVE OUTPUT OF A MACHINE

Donald R. Stewart and Ellis D. Kane, Detroit, Mich.

Application January 5, 1950, Serial No. 136,862

1 Claim. (Cl. 324—103)

Our invention relates generally to methods of determining machine shop efficiency and particularly to a method of determining a machine operator's pay.

One of the objects of our invention is to provide an improved method of determining a machine operator's pay in a manner to eliminate much, if not all, controversy now prevailing between management and labor where conventional time study methods are employed.

In connection with the above object, it is an object of our invention to provide an improved method of accurately determining a machine operator's pay, based on efforts of the operator in terms of energy units expanded over a given time period.

Another object of the invention is to provide an improved method of determining machine operator's pay which will increase and maintain efficiency of machining operations.

Another object of the invention is to provide an improved method of determining equitable work standards in connection with determining machine operator's pay.

Another object of the invention is to provide an improved method of measuring machine operators work automatically so as to eliminate the need of counting or weighing work pieces as a means of determining compensation.

Another object of the invention is to provide an improved method of determining best tools and methods for a given machining operation.

Other objects of the invention will become apparent from the following detailed description, taken in connection with the accompanying drawing in which:

Fig. 1 is a diagrammatic view of electrical metering and timing apparatus for carrying out in part our method;

Fig. 2 is a diagrammatic view of other electrical metering and timing apparatus for carrying out our method, and Fig. 3 is a diagrammatic view of apparatus similar to that of Fig. 2 for use where direct current is to be used.

Referring to the drawing by characters of reference, a machine (not shown) may be driven by a suitable electric motor 10 which, in the present instance, is illustrated as a three-phase motor connected to a suitable source of power by main lead wires 12, 14 and 16. In industrial plants, a high voltage, such as 440 v., is usually employed, and where voltage reduction is reqired for secondary circuits, as in the present instance, an auto transformer 18 may be used.

The auto transformer 18 is connected by suitable lead wires 20 and 22 to the main leads 12 and 14, respectively. Two additional transformers 24 and 26 which may be termed the potential transformer and current transformer, respectively, are employed, in the present system, but it will be understood that the number of transformers employed and the manner in which they are connected in the circuit depends, among other things, upon the type of electric motor used on a machine and upon the magnitude of the main line voltage.

The transformer 26 has a primary coil 28 connected by a lead wire 30 to the main lead wire 16 and the other transformer 24 has a primary coil 32 having one terminal connected by a lead wire 34 to a terminal of the transformer 26 or to the main line 16. The other terminal of the transformer primary coil 32 is connected to a suitable terminal of the auto transformer 18 by a lead wire 36.

The metering or indicating means comprises an energy or watt hour meter 38 and an electrically operated timer 40. Controlling operation of these devices 38 and 40 is a sensitive control relay 42. The watt hour meter 38, timer 40 and the relay 42 are in parallel in a potential circuit of the system.

The meter has a pair of potential terminals 44 and 46 and a pair of current circuit terminals 48 and 50. A lead line 52 connects the watt hour meter potential terminal 44 to one terminal of a secondary coil 54 of the transformer 24 and a lead wire 56 connects the other potential contact 46 of the meter 38 to a terminal of the electrically operated timer 40 which is connected by a lead wire 58 to the same side of the transformer secondary coil 54.

Relay 42 has a normally open, movable contact 60, a cooperable, fixed contact 62 and coil 64. Upon energization of the relay 42, the following circuit is closed: From the secondary coil 54 of transformer 24 through lead line 52, meter terminals 44 and 46, lead line 56, lead line 115, closed relay contacts 60 and 62, lead line 116 to the other side of the transformer secondary coil 54. Thus, when the above potential circuit is closed, the watt hour meter 38 and the timer 40 are energized and act to indicate energy and time respectively.

In order to provide a metering system which is responsive to slight changes in working load on the motor 10, I provide a second control or relay 66 which is arranged to control operation of the potential circuit controlling relay 42. This second relay 66 is more sensitive in operation than the potential circuit controlling relay 42; the relay 66 being made to respond to slight changes in the current.

The relay 66 comprises, in general, a movable contact 68, a cooperating fixed contact 70 and a coil 72. A lead line 74 connects the fixed contact 70 of relay 66 to the potential circuit lead line 58 and a lead line 76 connects the movable contact 68 of relay 66 to one end of the coil 64 of the relay 42, through rectifier 80. The other end of the relay coil 64 is connected by a lead wire 78 to the potential circuit lead line 116. Thus, when the sensitive relay contacts 68 and 70 are closed, the following circuit is closed, causing relay 42 to be energized: From one side of the transformer secondary 54 through closed relay contacts 70 and 68, lead wire 76, relay coil 64, lead wire 78 and lead wire 58 back to the other side of the transformer secondary coil 54. In the lead lines 76 and 78, I provide a rectifier 80 to eliminate the effect of alternating current on the sensitive relay 66 which otherwise would respond to the changing current.

The coil 72 of the relay 66 is connected by lead wires 117 and 118. Lead wire 117 is connected through rectifier 90 and lead wire 82 to one side of the secondary coil 86. Lead wire 118 is connected through rectifier 90 and lead wire 116 to the movable contact 110 of safety control relay 106. The fixed contact 112 of normally closed relay 106 is connected by lead wire 114 to the potentiometer 92 which is connected across lead lines 82 and 84 which are connected to opposite ends of a transformer secondary coil 86 of a fourth transformer 88.

Potentiometer 92 is adjustable to regulate the current flowing to the sensitive coil 72 of the relay 66 so that the relay contacts 68 and 70 are open on free running load of the motor 10 and close immediately upon the smallest increment of load being placed on motor 10. The transformer 88 has one end of its primary coil, as at 94, connected by a lead wire 96 to one terminal or side of the secondary coil 98 of the transformer 26. A lead wire 100 connects the other end of the transformer primary coil 94 to the terminal 48 of the watt hour meter 38. The other current terminal 50 of the watt hour meter 38 is connected by a lead line 102 to a coil 104 of a safety control or relay 106; the other end of the relay coil being connected to a terminal of the transformer secondary 98 by a lead wire 108.

The safety relay 106 includes a movable contact 110 and a cooperating, fixed contact 112. These contacts 110 and 112 are normally in engagement, as shown. A lead wire 114 connects the relay fixed contact 112 to the lead wire 84 of the transformer secondary coil 86 and a lead wire 116 connects the relay movable contact 110 to the coil 72 of the sensitive relay 66.

It will now be seen that as long as the safety control contacts 110 and 112 remain in contact, the sensitive relay 66 may be energized and act to close the circuit of the potential line relay control 42. However, when excessive currents exist, such as occurs when the motor 10 is started, the relay coil 104 will be energized and break contacts 110 and 112, opening the circuit of the sensitive relay 66. Thus, the safety relay 106 acts to prevent excessive current flow to the sensitive relay 66 to prevent damage to the latter. Also, the safety relay 106, by breaking the circuit of the sensitive relay 66 prevents recording of the motor starting energy which otherwise would constitute an inaccuracy in the meter reading, since it is desired to meter only the energy input to the motor 10 during the application of a work load on the motor. When the starting load on the motor 10 returns to the normal range of operating load, the safety relay closes contacts 110 and 112 after which the sensitive relay is responsive to loads applied to the motor 10.

Upon application of a load on the motor 10 in addition to free running load of the motor, the sensitive relay 66 responds immediately, energizing the relay 42 which then acts immediately to close the potential circuit of the meter 38 and timer 40. These devices then operate to indicate the energy used and the time period of use of the energy so long as the load on the motor 10 remains greater than free running or idling load of the motor. Upon removal of the load on the motor 10, the sensitively responsive relay 66 breaks circuit to the less sensitive relay 42 which in turn opens the potential circuit of the watt hour meter 38 and the timer 40.

It can be seen that the above described instruments will measure automatically the productive time and energy consumed by any electrically operated machine.

In accordance with our method of determining accurately the earnings of machine operators, certain information is first obtained concerning the machines, tools, methods and workmen of a particular shop. Usually machine shops have a number of the same kind of machine, but it has been found that the work output on such machines may differ although the skill and effort of the operators may be the same. For example, apparent like machines may require different energy for free running load. Therefor, we desire to rate machines in accordance with what we term "machine capacity utilization," which is the rate of doing work on the machine. By machine capacity utilization we mean the degree to which a machine is being used as regards its rate of doing work in relation to the inbuilt capacity of the machine and its tool for rate of doing work. The rate of doing work on automatic machines is generally limited by the driving motor or by the cutting tool. On hand operated machines, when the operator applies the work to the tool, or the tool to the work, the rate of doing work is controlled by the operator.

To determine the capacity utilization of a machine, we indicate concurrently, by means of the watt hour meter 38 and the timer 40, or apparatus of Fig. 1, the productive time and energy expended over a selected elapse time of operation of the machine under load, and then divide the productive energy value indicated by the productive time value indicated. The resultant value is a measure of the machine's capacity utilization. This may differ for apparent like machines due, for example, to the machines having different free running loads. In order that this variation may be determined and taken into consideration, we measure the free load energy required by a particular machine for a given time period, multiply this by the elapsed time to obtain the total free load and then deduct the total free load from the apparent energy recorded to obtain productive energy expended at the tool. This productive energy value, as hereinafter described, is used as a basis for determining the machine operator's pay. It is to be understood that when machines are alike and require the same free load energy, the above step is not necessary.

The watt hour meter 38 and the timer 40 can also be used to determine the best tools and methods for a given machining operation. For example, readings may be taken for each of a number of tools and for each of a number of methods of machining and the values compared. That is, the best tool and the best method will be the ones which require the least productive energy per unit of work produced. The productive energy is measured with the watt hour meter 38 and the timer 40 and the work produced can be counted or weighed.

The second step of our method is to determine a standard day's work in terms of productive energy. Having established in step No. 1, the capacity utilization of a given machine, the second step is to measure, by means of the meter 38 and timer 40, the productive energy that is expended in the operation of the machine over an established working day, say eight hours, by an operator of known average ability. This gives the number of energy units that an average worker should expend and for this work a rate of pay can be established or agreed upon between management and labor.

At this point in the method we have established (1) the capacity utilization of a given machine; (2) a standard day's work on the machine in terms of productive time and energy; and (3) the operator's compensation per energy unit.

Having established the above data and standards, each machine of the machine shop may now be provided with an energy metering apparatus, such as is shown in Fig. 2, where alternating current is used, or such as the apparatus shown in Fig. 3 where direct current is used.

Use of the recording apparatuses, shown in Figs. 2 and 3 for permanent attachment to machines is recommended in the interests of economy as such apparatuses are much more simple than the apparatus of Fig. 1. The apparatus of Fig. 2 comprises, in general, a watt hour meter 116 and a time meter 118. These devices are connected, as shown in the main leads 120, 122 and 124 of the electric motor 126 to indicate the total energy used thereby. By deducting the electrical energy used in free running of the motor 126, the energy used productively can be obtained.

In Fig. 3, the apparatus for use with direct current comprises a direct current watt hour meter 128, a time meter 130, and a relay 132. The numerals 134 and 136 respectively designate the direct current main leads of a machine driving motor 138. Connected across the leads 134, 136 is the watt hour meter 128. In the lead wire 134 is the coil of the relay 132 which controls the alternate current circuit of the time meter 130.

It will be understood that where it is desired or required to indicate only energy units, the time meters of Figs. 2 and 3 may be omitted.

The method may be said to include an incentive plan of payment of machine operators which will be beneficial both to management and labor. For example, if we divide the amount of money that is mutually agreed to be paid for a standard day's work (step No. 2) by the productive energy units expended in a day's work we obtain a value which may be termed the incentive pay per energy unit.

To determine the earnings of any operator in a machine shop, it is only necessary to multiply the above established incentive pay per energy unit by the productive energy units recorded on the watt hour meter on the operator's machine or energy units expended in an elapsed time period.

The method may be used to determine a bonus plan beneficial both to management and labor. To accomplish this we first determine the expected life of a tool in terms of productive energy units. Using the above established machine capacity utilization and the data on best tools and methods we measure the energy units expended during the life of the tool. This gives an average or life expectancy for similar or like tools. Thus, a bonus may be offered to all operators the life of whose machine tool exceeds the established life expectancy of the tool. This bonus may be determined by multiplying the excess energy units over and above the expected tool life energy units by a selected bonus pay in terms of energy units for tool life.

After the standards have been established, they must be maintained by self-supervision on the part of the operators or other supervision. Self-supervision has proven to be best where satisfactory incentive systems have been established.

Generally, systems developed by time study have given unsatisfactory results due to their being complicated and the fact that time is not a measure of work. Also on expensive machine tools, incentive systems based on time study alone have resulted in misuse of machines and tools.

Expensive cutting tools are all characterized by their ability to most economically withstand so much force at their cutting face. If the operator increases his rate of doing machine work, this force increases, if he lowers his rate of doing machine work, this force decreases, and both result in uneconomical operating costs.

In order that optimum rate of doing work be maintained, we set up a standard for the amount of energy units a driving motor will consume during the life of the average cutting tool under the optimum rate of doing work.

Payment of a bonus to the operators for tool life in energy units within a stipulated percentage of the average expectancy, directs the operators toward the desired rate of doing work and means a savings in expensive tool cost and machine repairs.

Results have been unsatisfactory where such a plan has been worked on "pieces produced" due to the variation in the amount of work necessary per piece, difference in machinability, etc.

From the above steps it will be noted that we have established a new method of determining standards for machine capacity utilization, rate of doing machine work and best tools and methods, and a standard day's work on the part of the machine operator. We have also determined a new method of compensating the operator as an incentive for producing more work and this incentive is based on the amount of work he has done, rather than the amount of work or pieces produced.

Although a preferred form of the invention has been illustrated and described in detail, it will be apparent to those skilled in the art that various modifications may be made therein without departing from the spirit of the invention or from the scope of the appended claim.

We claim:

The method of determining the productive output of a machine having an electric driving motor which method comprises running the motor under free running load, connecting the motor electrically to an energy registering device only when the load on the motor exceeds the free running load thereof, and simultaneous with connection of the registering device and motor connecting an electrically operated timer to the motor and registering the interval of operation of the motor at loads in excess of free running load.

References Cited in the file of this patent

UNITED STATES PATENTS

| | | |
|---|---|---|
| 1,163,226 | Evans et al. | Dec. 7, 1915 |
| 1,175,508 | Burke | Mar. 14, 1916 |
| 1,206,284 | Allen et al. | Nov. 28, 1916 |
| 1,449,458 | Sutermeister | Mar. 27, 1923 |
| 1,451,281 | Sundh et al. | Apr. 10, 1923 |
| 2,283,993 | Holtz et al. | May 26, 1942 |
| 2,340,114 | Duis | Jan. 25, 1944 |
| 2,352,779 | Ehrenfeld | July 4, 1944 |
| 2,447,803 | Hobby | Aug. 24, 1948 |
| 2,568,406 | Packer et al. | Sept. 18, 1951 |

FOREIGN PATENTS

| | | |
|---|---|---|
| 32,915 | Norway | Aug. 15, 1921 |
| 703,517 | Germany | Feb. 6, 1941 |